United States Patent [19]
Dougherty

[11] 3,889,385
[45] June 17, 1975

[54] LIQUID DENTAL OPAQUER AND METHOD

[76] Inventor: Emery W. Dougherty, 123 School Ln., Milford, Del. 19963

[22] Filed: Oct. 31, 1973

[21] Appl. No.: 411,535

Related U.S. Application Data

[62] Division of Ser. No. 225,657, Feb. 11, 1972, abandoned.

[52] U.S. Cl.................... 32/12; 117/75; 117/132 C; 161/218; 260/33.6 UA; 264/19; 264/20
[51] Int. Cl.............................................. A61c 5/08
[58] Field of Search............ 117/75; 32/12; 264/19, 264/20; 156/332

[56] References Cited
UNITED STATES PATENTS

| | | | |
|---|---|---|---|
| 2,916,469 | 12/1959 | Lal | 156/332 X |
| 3,470,615 | 10/1969 | Petner | 117/75 X |
| 3,647,498 | 3/1972 | Dougherty | 32/12 X |
| 3,726,739 | 4/1973 | Dalibor et al. | 156/332 X |

*Primary Examiner*—Ralph Husack

[57] ABSTRACT

Dental methods and compositions are disclosed for improving the adhesion of opaquer compositions to dental metal work and for preventing solvation of the opaquer compositions by the application of methyl methacrylate containing resins for dental restorations.

3 Claims, No Drawings

LIQUID DENTAL OPAQUER AND METHOD

This is a division, of application Ser. No. 225,637, filed Feb. 11, 1972, now abandoned.

BACKGROUND OF THE INVENTION

This invention relates to improvements in the manner of using dental resins for dental restorations and more particularly to a novel opaquer composition and its method of use.

Methyl methacrylate containing dental resin materials have been satisfatorily applied in the construction of crown and bridge prosthesis. Such materials, by virtue of their excellent optical properties and color stability in oral environments are used to veneer metal substructures and thus simulate natural teeth. In order to accomplish the above in an acceptable manner, it is known to opaque the metal substructure in order to mask out the metal. The methyl methacrylate containing dental crown and bridge resin materials, shaded with suitable pigments, is then placed over the opaqued metal substructure.

Mixtures of polymers and copolymers of methyl methacrylate and a suitable polymerization catalyst may be themselves used as opaquing compositions where relatively greater concentrations of pigments are added. In practice, the above mixture is slurried with methyl methacrylate monomer containing, e.g., cross linkers and N,N dimethyl-p-toluidene, and applied when the mixture has increased in viscosity so that a suitable consistency for painting onto the metal substructure is obtained. A deficiency of such a composition is that it is necessary to wait some time before the mixture reaches a suitable viscosity, and then to discontinue painting when the viscosity becomes excessively high. Although it is possible to reduce the viscosity of the advancing solution of poly methyl methacrylate in methyl methacrylate monomer by increasing the concentration of the liquid monomer constituent, the result is an overall change in the concentration of amines and cross-linking monomers in the slurry. Eventually it is impossible to add additional monomemr because of the very high viscosity attained in such systems.

To avoid the waiting period before the slurry is ready for painting, it is known to produce more readily soluble copolymers, tripolymers or tetrapolymers. For example, adhesive compositions formulated from copolymers containing methacrylic acid, styrene, acrylonitrile and methyl methacrylate, such as discussed in U.S. Pat. No. 2,916,469, have been used when pigmented with some success as opaquing materials. While such compositions have exhibited adequate adhesion to metal such as gold, stainless steel and the like, they have not been totally satisfactory for a variety of reasons, the most important deficiency being the compositions are readily soluble in methyl methacrylate.

The conventional technique for producing a crown and bridge prosthesis veneered with a methacrylate crown and bridge material is first to paint one of the aforementioned slurries of opaquing material over the prepared metal sub-structure of the crown and bridge prosthesis. When sufficient opaquing material has been applied so as to completely mask the previously visible portions of the underlying material, the opaqued layer is then permitted to harden by curing, that is, polymerization of the opaquing resin constituents. The mixture of crown and bridge material containing methyl methacrylate is then pressed against the opaqued surface.

At this point, if the underlying opaquing resin has been deposited improperly as in the situation where methyl methacrylate monomer present in the resin evaporates before polymerizing, then the crown and bridge resin containing methyl methacrylate will soften the underlying resin, displace it and even remove it from masking portions of the underlying material. Even if the opaquing resin has been properly applied and polymerized completely, the solvent action of the methyl methacrylate in the crown and bridge veneer resin will soften the underlying opaqued resin layer with the same but perhaps less severe results. While not being removed by the solvent action, the pigment can be diffused into the crown and bridge veneer resin to such an extent as to adversely affect the quality of the shading in the finished appliance.

It has been learned that it is possible to coat a prosthetic appliance with an opaquing material which will not be softened, displaced, or otherwise adversely affected by the application of a crown and bridge resin veneer containing methyl methacrylate monomer. Such a composition consists essentially of a copolymer comprising between 20 to 60 parts by weight of acrylonitrile and between 40 to 80 parts by weight of methyl methacrylate. Contrary to the experience of the previously used polymer films, an acceptable solvation resistant adhesive polymer film can be prepared with copolymers comprising these materials without the further addition of other compounds.

Preferably, the technique for applying the opaquing material of the present invention to a metal crown and bridge prosthetic appliance is to dissolve the copolymer in a suitable solvent such as nitromethane, to disperse a suitable pigment in the solution, applying the solution to the material to be masked, and permitting the solvent to evaporate, thereby leaving a hard methyl methacrylate resistant film of pigmented resin.

The composition of the present invention exhibits substantially no solubility in methyl methacrylate when it contains about 60% by weight of acrylonitrile. This can be demonstrated by mixing 100 micron beads of suspension polymerized copolymer with methyl methacrylate and observing some swelling but no apparent solvation after several hours. Likewise, when the copolymer contains below 20% of acrylonitrile, it is softened and is subsequently dissolved by liquid methyl methacrylate monomer. Between these limits of 20% to 60% by weight of acrylonitrile, the copolymer is uniquely suited for opaquing film formation by virtue of its adhesion particularly to metal substrates.

Although the copolymers of this invention are relatively insoluble in methyl methacrylate, crown and bridge material containing methyl methacrylate monomers bonds firmly to the opaquing film after it has been polymerized in contact with the opaquer film. Evidence of this was found in the failure of tensile adhesion specimens where failure was ordinarily at the gold opaquer interface, or through the crown and bridge material, but not at the opaquer/crown and bridge material interface.

The copolymer is preferably formed by suspension polymerization but may be made by other conventional techniques at the selection of the operator.

It its preferred form the copolymer is dissolved in a solvent such as a nitroparaffin or a halogenated hydrocarbon or mixtures of both or together with other suitable solvents. A pigment is then disbursed in the solvent in sufficient quantity to render the finished polymerized film opaque. Suitable pigments for use in the composition of this invention include silica, titanium dioxide, zinc oxide, iron oxide, barium sulfate and mixtures thereof.

It may also be desirable when compounding specific formulation of opaquers according to this invention that a small amount of methacrylic acid or other carboxylic acid be included in the solution. The presence of such material is not essential to the practice of the present invention but may prove to be of added benefit in amounts up to about 5 parts by weight. In addition, beneficial results are achieved particularly in promoting adhesion of the opaquer film to the metal substrate when certain silane compounds are added in small amounts to the copolymer-containing solution. Suitable silane compounds include gamma-methacryloxypropyltrimethoxysilane, carbethoxy propyl methyl diethoxy silane, diphenyl diethoxy silane and dimethyl dichloro silane. The preferred compound gamma-methacryloxypropyltrimethoxysilane has the structural formula

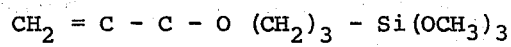

These materials are used in amounts of from about 0.01 to 2.0 parts by weight of the composition. Other adhesion promoting modifiers may additionally be used with the silane selected.

In the practice of the present invention it has been found desirable to permit complete drying of the opaquer composition in order to prevent any possibility of bleeding of the pigment when a methyl methacrylate-containing material is placed in contact therewith. The advantages derived according to the present invention can be easily demonstrated by rubbing a dried film with a cotton swab saturated with methyl methacrylate for an extended period of time without observing any bleeding of the pigment or displacement of the film in any manner which would hamper its use as an opaquer.

The following are examples of copolymer preparation and compositions prepared and used in accordance with the present invention:

EXAMPLE I

A series of polymers were prepared under air in a reactor which provided vigorous agitation at about 75°C for about 3 hours. The polymers were separated in the form of small beads and washed with copious volumes of water, and subsequently dried at about 70°C for 16 hours to remove water and residual monomers.

TABLE NO. 1

| COPOLYMER | 1 | 2 | 3 | 4 | 5 |
|---|---|---|---|---|---|
| water | 333 | 333 | 333 | 333 | 333 |
| sodium polyacrylate | 8 | 8 | 8 | 8 | 8 |
| acrylonitrile | 20 | 30 | 40 | 50 | 60 |
| methyl methacrylate | 80 | 70 | 60 | 50 | 40 |
| benzoyl peroxide | 1.2 | 1.2 | 1.2 | 1.2 | 1.2 |

COMPOSITION OF COPOLYMERS (parts by weight)

Small amounts of the several copolymers listed in Table No. 1 were mixed with each of three solvents in test tubes. After 1 hour the characteristics of the solution were visually observed. The observations are summarized in Table No. 2.

TABLE NO. 2

Gross Solubility Characteristics in Three Solvents

| COPOLYMER | IN NITROMETHANE | IN ETHYLENE DICHLORIDE | IN METHYL METHACRYLATE |
|---|---|---|---|
| 1 | clear solution | clear solution | slightly cloudy solution |
| 2 | clear solution | clear solution | cloudy, partly soluble, partly undissolved |
| 3 | clear solution | slightly hazy solution | very cloudy, swollen polymer |
| 4 | hazy solution | cloudy solution | insoluble |
| 5 | hazy solution | cloudy solution | insoluble |

EXAMPLE II 10 parts of each of copolymers 3, 4, and 5 were separately dissolved in 75 parts nitromethane and 7 parts titanium dioxide dispersed therein. The resulting dispersion was applied to a brass substrate. After 45 minutes methyl methacrylate monomer and a mixture of precured crown and bridge material pressed against the films failed to swell or displace them.

EXAMPLE III 10 parts of copolymers 3 of Example I were dissolved in 75 parts of nitro-methane containing 0.1 part of gamma-methacryloxypropyltrimethoxysilane. Into the solution was dispersed 6 parts of titanium dioxide, 2 parts of zinc oxide and 0.25 parts of iron oxide. The resulting dispersion of pigments in the copolymer solution was evaluated as follows.

A dental gold plate was scrubbed with steel wool and household cleansing powder. The gold plate was then washed in water, dried and then washed in toluene and ethyl acetate for 30 seconds each. After drying, the opaquer solution was painted over the surface of the gold. The opaquer was dried 10 minutes in air at room temperature and then covered with crown and bridge resin containing methyl methacrylate monomer by pressing the resin against the surface of the opaquer.

One minute later the assembly was placed then into a pressure cooker containing mineral oil preheated to 104°F. The lid was closed and the pieces were cured for about 30 minutes under 2.1 Kg/cm² of air pressure. After cooling and drying the resin assembly was pried away from the gold backing. The opaquer stayed with the crown and bridge material upon separation. The entire polymer assembly held with great tenacity to the gold and was removed only with difficulty.

EXAMPLE IV

Numerous tests were conducted on ¼ inch square brass bars which were squared at the ends and finished with No. 400 metalographic paper. The brass was washed in water, toluene, and ethyl acetate, dried and then gold plated. The bars were washed off after removal from the gold plating solution and dried at 70° C for 30 minutes. They were then painted with the opaquer solution in Example 2. After drying 10 minutes at 23°C a mixture of crown and bridge material containing methyl methacrylate was applied for either 3-5 minutes or 10-14 minutes. The precured crown and bridge material was placed between two bars coated with opaquing film. The bars were pressed together and aligned in such a fashion that the edges were parallel and the crown and bridge material separated the bars by about 1-2 millimeters. These were then carefully transferred and cured in water in a pressure cooker at 1.04 Kg/cm² for 30 minutes. After cooling, the excess crown and bridge material was ground away and the bars were stored for 24 hours in air at 23°C. The samples were tested in tension. Although there is a considerable variation in values between repetative tests because of surface finishing and variations in plating, etc., the information is especially useful since it is observed that the failure usually exists at the metal opaquer interface, sometimes within the resin (crown and bridge material) itself, but never at the opaquer/resin interface. The average tensil adhesion was 55 Kg/cm² with a standard deviation of 26.8 Kg/cm² for four specimens. A control treated in a similar manner, but where the opaquer film was produced using a commerical powder and liquid composition, had tensile adhesion values of 52 Kg/cm² with a standard deviation of 17.6 Kg/cm² with a set of four specimens. The test was repeated. In this case an average of 93 Kg/cm² with a standard deviation of 33.8 Kg/cm² using four specimens was realized. In a third and fourth set identical to those previously reported, but reducing the time during which the crown and bridge material was in contact with the opaquer, tensile adhesion values of 66.8 Kg/cm and 67.5 Kg/cm² were measure.

EXAMPLE V

Bars were prepared in a similar way but instead of storing for 24 hours in air before testing, the specimens were stored in water at 37°C for 7 days. An average tensile adhesion value of 105.5 Kg/cm² with a standard deviation of 62 Kg/cm² for 6 specimens was found. The deduction is that the opaquers of this invention have adhesive values to gold treated brass bars which are equal to those of present commerical practice, that the adhesion persists in water, and that the failure usually occurs at the metal to opaquer interface or through the resin itself but never at the opaquer resin interface.

It has also been learned that the advantages of the present invention are enhanced when an adhesion promoting compound, such as the silanes described hereinbefore, is added to the crown and bridge veneering composition.

It should be understood that the foregoing description and examples of the preferred embodiments of the present invention do not embrace all of the possible applications and formulations of the present invention and the invention should not be limited thereby.

I claim:

1. Dental work comprising in combination a metal substrate selected from the group consisting of a dental base metal alloy, a nobel metal or a nobel metal alloy; a dental opaquing composition overlying said metal substrate and comprising a copolymer of from about 20 to about 60 parts by weight of acrylonitrile and from about 40 to about 80 parts by weight of methyl methacrylate, and a dental crown and bridge resin comprising metayl methacrylate overlying said dental opaquing composition.

2. A method of preparing crown and bridge prosthesis comprising the steps of opaquing prepared dental base metal alloy, nobel metal, or nobel metal alloy dental work by applying a solution having dissolved therein methacrylic acid, a copolymer of from about 20 to about 60 parts by weight of acrylonitrile and from about 40 to about 80 parts by weight of methyl methacrylate, and an adhesion promoting compound selected from the group consiting of carbethoxy propyl methyl diethoxy silane, diphenyl diethoxy silane, dimethyl dichloro silane, and gamma-methacryloxypropyltrimethoxysliane having the formula

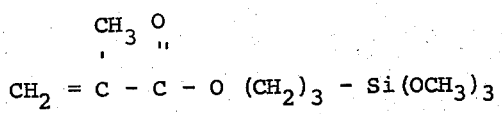

and having dispersed therein a sufficient quantity of opaquing pigment to permit complete masking of the dental metal work, evaporating the solvent and applying a crown and bridge dental resin in methyl methacrylate monomer vehicle to the opaqued surface to complete the dental work.

3. The method of claim 2 wherein the gamma-methacryloxypropyltrimethoxysilane is about 0.01 to 2.0 parts by weight of the composition.

* * * * *